(12) United States Patent
Tweet et al.

(10) Patent No.: US 9,850,000 B2
(45) Date of Patent: Dec. 26, 2017

(54) SYSTEMS AND METHODS FOR CONTAINING IGNITION WITHIN EQUIPMENT DRY BAYS

(71) Applicant: The Boeing Company, Seal Beach, CA (US)

(72) Inventors: Tracy Lee Tweet, Stanwood, WA (US); Michael Kent Dove, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 426 days.

(21) Appl. No.: 14/193,002

(22) Filed: Feb. 28, 2014

(65) Prior Publication Data

US 2015/0246734 A1  Sep. 3, 2015

(51) Int. Cl.
| | |
|---|---|
| *B65D 90/22* | (2006.01) |
| *B64D 45/00* | (2006.01) |
| *B64D 37/32* | (2006.01) |
| *A62C 3/06* | (2006.01) |
| *B64D 25/00* | (2006.01) |
| *B64D 37/08* | (2006.01) |
| *B64D 11/06* | (2006.01) |
| *A62C 3/08* | (2006.01) |
| *A62C 4/00* | (2006.01) |

(52) U.S. Cl.
CPC .............. *B64D 45/00* (2013.01); *A62C 3/065* (2013.01); *B64D 11/0601* (2014.12); *B64D 25/00* (2013.01); *B64D 37/08* (2013.01); *B64D 37/32* (2013.01); *A62C 3/08* (2013.01); *A62C 4/00* (2013.01); *B64D 2045/009* (2013.01)

(58) Field of Classification Search
CPC ............ B64D 37/34; B64D 45/00; A62C 4/00
USPC ........................................................ 220/88.2
See application file for complete search history.

(56) References Cited

U.S. PATENT DOCUMENTS

| | | | |
|---|---|---|---|
| 3,846,178 A | 11/1974 | Evjen et al. | |
| 4,013,190 A * | 3/1977 | Wiggins | A62C 4/00 220/501 |
| 4,180,177 A | 12/1979 | Gunderman et al. | |
| 4,328,901 A | 5/1982 | Gunderman et al. | |
| 4,484,690 A | 11/1984 | Nash | |
| 4,751,154 A | 6/1988 | Binder et al. | |
| 4,763,731 A | 8/1988 | Adams et al. | |

(Continued)

FOREIGN PATENT DOCUMENTS

| | | |
|---|---|---|
| WO | 2005079205 A2 | 9/2005 |
| WO | 2007071908 A1 | 6/2007 |

OTHER PUBLICATIONS

Grossel, S.; Deflagaration and Detonation Flame Arrestors; Process Safety and Design, Inc.; Center for Chemical Process Safety; © 2002; 2 pages.

*Primary Examiner* — Jeffrey Allen
(74) *Attorney, Agent, or Firm* — Armstrong Teasdale LLP

(57) ABSTRACT

An equipment dry bay is provided. The equipment dry bay includes at least one partition that subdivides the equipment dry bay into a plurality of compartments, wherein the at least one partition includes a plate, and at least one flame arrestor positioned within the plate and providing vapor and fluid communication between a first compartment and a second compartment of the plurality of compartments, the at least one flame arrestor configured to vent combustion gases in the first compartment into the second compartment.

16 Claims, 5 Drawing Sheets

(56) References Cited

U.S. PATENT DOCUMENTS

| | | |
|---|---|---|
| 5,178,973 A | 1/1993 | Binder et al. |
| 5,191,990 A | 3/1993 | Fritts |
| 6,372,983 B1 | 4/2002 | Knaggs |
| 6,915,861 B2 | 7/2005 | Goodworth et al. |
| 2003/0218098 A1* | 11/2003 | Goto ............... B64D 37/08 244/135 R |
| 2005/0178880 A1* | 8/2005 | Howe ............... B64D 37/04 244/10 |
| 2005/0181152 A1 | 8/2005 | Free et al. |
| 2006/0218934 A1 | 10/2006 | Williams et al. |
| 2010/0116361 A1* | 5/2010 | Furuhashi ......... B60K 15/077 137/398 |
| 2012/0273239 A1 | 11/2012 | Brennan |
| 2013/0206759 A1 | 8/2013 | Wurz et al. |

* cited by examiner

SYSTEMS AND METHODS FOR CONTAINING IGNITION WITHIN EQUIPMENT DRY BAYS

BACKGROUND

The field of the disclosure relates generally to equipment dry bays, and, more particularly, to mitigating effects of ignitions (e.g., explosions) that may occur in an equipment dry bay.

Fuel tanks and other systems typically include one or more equipment dry bays, such as the conventional equipment dry bay 10 shown in FIG. 1. Equipment dry bay 10 is defined by an outer wall 12 and an inner wall 14, and includes a plurality of pieces of electrical equipment 16. In the event that fuel leaks into equipment dry bay 10, faults in electrical equipment 16 may ignite the leaked fuel.

Accordingly, Federal Aviation Regulations require that areas where flammable fluids might leak include means to minimize the probability of ignition and means to minimize resultant hazards if ignition does occur. One of the hazards of an ignition occurring is that pressures within an unvented bay may increase substantially. For example, if ignition occurs in equipment dry bay 10, the pressure may increase from ambient to approximately 120 pounds per square inch absolute (psia). For normal operation, structural design pressures for equipment dry bay 10 may be much lower. Accordingly, to facilitate handling increased pressures generated by ignition, to increase strength, a typical equipment dry bay design would require additional structural material that is relatively expensive and relatively heavy.

In at least some known fuel tank assemblies, foam blocks are utilized to reduce ignition threats. The foam blocks have a cell structure that allows fuel to permeate the blocks, minimizing displacement of fuel. Further, the blocks suppress propagation of flames in the event ignition occurs. Such foam blocks may impede access to equipment and may themselves be flammable. In other known electrical enclosures, pressure generated from an ignition is vented to an external environment surrounding the enclosure. However, in some implementations, such as a fuel tank equipment bay in a pressurized cabin, it may not be feasible or desirable— or even compliant with regulations—to vent excess pressure to the surrounding environment.

BRIEF DESCRIPTION

In one aspect, an equipment dry bay is provided. The equipment dry bay includes at least one partition that subdivides the equipment dry bay into a plurality of compartments, wherein the at least one partition includes a plate, and at least one flame arrestor positioned within the plate and providing vapor and fluid communication between a first compartment and a second compartment of the plurality of compartments, the at least one flame arrestor configured to vent combustion gases in the first compartment into the second compartment.

In another aspect, a fuel tank assembly is provided. The fuel tank assembly includes a fuel storage compartment, at least one pump dry bay positioned within said fuel storage compartment, and an equipment dry bay positioned within the fuel storage compartment and including at least one partition that subdivides the equipment dry bay into a plurality of compartments. The at least one partition includes a plate, and at least one internal flame arrestor positioned within the plate and providing vapor and fluid communication between a first compartment and a second compartment of the plurality of compartments, the at least one internal flame arrestor configured to vent combustion gases in the first compartment into the second compartment.

In yet another aspect, a method for containing ignitions within an equipment dry bay is provided. The method includes subdividing the equipment dry bay into a plurality of compartments using at least one partition, wherein the at least one partition includes a plate and at least one flame arrestor positioned within the plate and providing vapor and fluid communication between a first compartment and a second compartment of the plurality of compartments, and venting combustion gases from an ignition in the first compartment into the second compartment through the at least one flame arrestor.

DETAILED DESCRIPTION

The systems and methods described herein provide an equipment dry bay that includes a partition. The partition subdivides the equipment dry bay into a first compartment and a second compartment. Further, the partition includes a plate and at least one flame arrestor positioned within the plate. Accordingly, in the event that an ignition occurs in the first compartment, combustion gases from the ignition vent into the second compartment through the flame arrestor. This substantially reduces pressure and temperatures generated by the ignition, and prevents the ignition from spreading to the second compartment.

Figure 2:
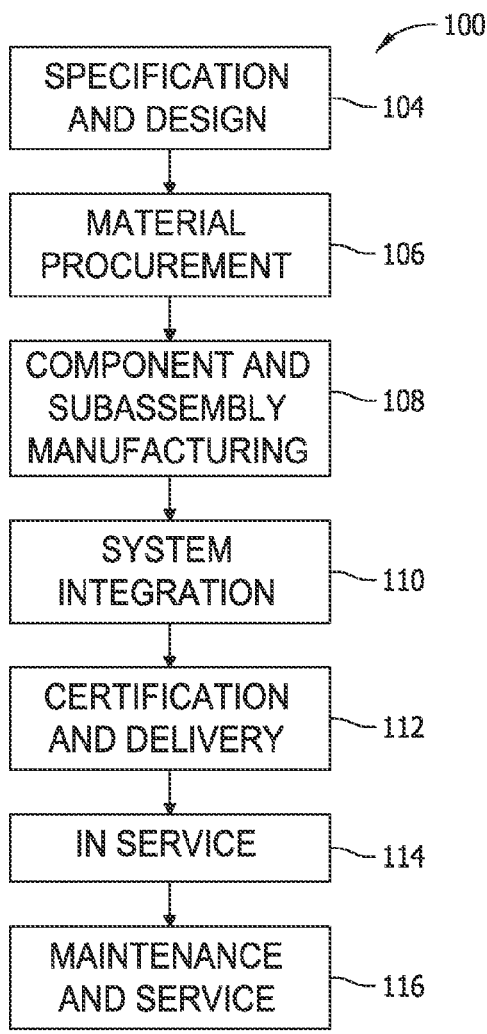
FIG. 2 is a flow diagram of an exemplary aircraft production and service methodology.
Figure 3:
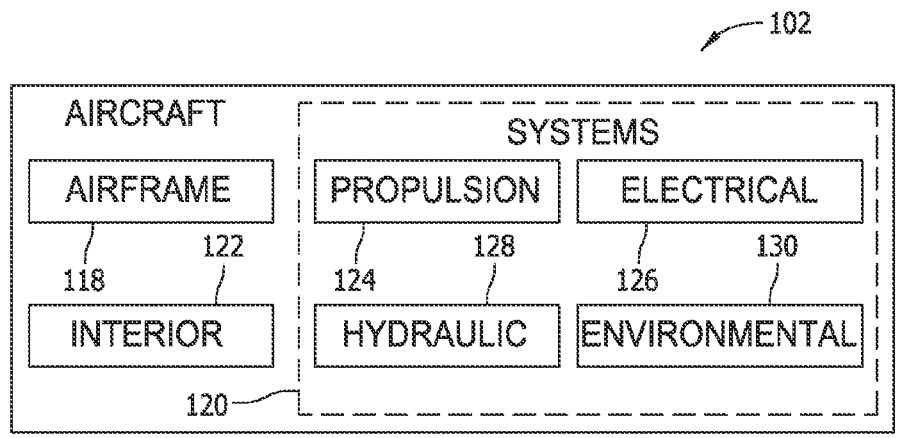
FIG. 3 is a block diagram of an aircraft.

Referring more particularly to the drawings, implementations of the disclosure may be described in the context of an aircraft manufacturing and service method 100 as shown in FIG. 2 and an aircraft 102 as shown in FIG. 3. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 3, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatuses and methods implemented herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus implementations, method implementations, or a combination thereof may be utilized during the production stages 108 and 110, for example, by substantially expediting assembly of or reducing the cost of an aircraft 102. Similarly, one or more of apparatus implementations, method implementations, or a combination thereof may be utilized while the aircraft 102 is in service, for example and without limitation, to maintenance and service 116.

Figure 1:
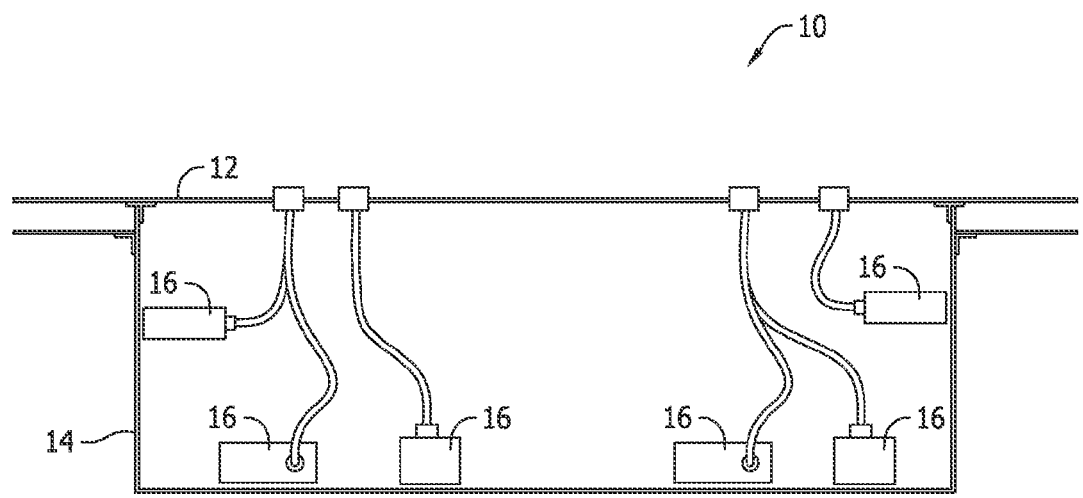
FIG. 1 is a schematic view of a known equipment dry bay.
Figure 4:
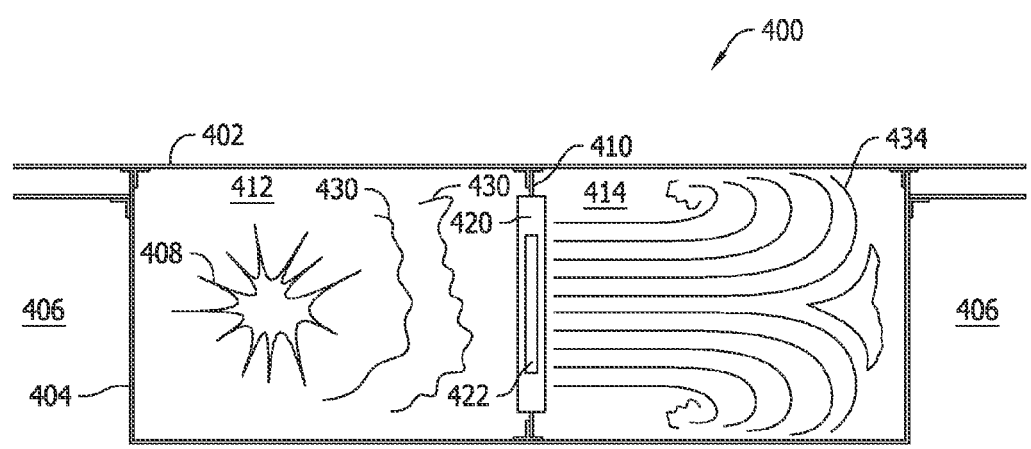
FIG. 4 is a schematic view of an exemplary equipment dry bay that includes an ignition.

FIG. 4 is a schematic view of an exemplary equipment dry bay 400. Like known equipment dry bay 10 (shown in FIG. 1), equipment dry bay 400 includes one or more pieces of electrical equipment. For clarity, however, the electrical equipment is not shown in FIG. 4. Equipment dry bay 400 is defined by an outer wall 402 and an inner wall 404. In the exemplary implementation, outer wall 402 also forms an outer wall of a fuel tank (not shown in FIG. 4), and inner wall 404 defines a fuel storage compartment 406 of the fuel tank. The fuel tank may be, for example, a fuel tank of aircraft 102 (shown in FIG. 3).

Although in the exemplary implementation, equipment dry bay 400 is implemented in a fuel tank, those of skill in the art will appreciate that equipment dry bay 400 may be implemented in a wide variety of systems that include sealed electrical enclosures. For example, equipment dry bay 400 may be a battery housing. That is, as used herein, an 'equipment dry bay' may include any sealed electrical enclosure where it may be desirable to contain and/or mitigate ignition events. Accordingly, the systems and methods described herein are not limited to use with a fuel tank.

In the exemplary implementation, equipment dry bay 400 is in proximity to fuel being stored in the fuel tank. Specifically, inner wall 404 is in contact with fuel and is wetted by fuel, forming a portion of a primary fuel barrier for equipment dry bay 400. A top of equipment dry bay 400 (i.e., at outer wall 402) forms a portion of a secondary barrier for equipment dry bay 400 and is in contact with a cabin environment. Drain lines (not shown in FIG. 4) are provided at a low point of equipment dry bay 400 to prevent pooling of fuel in the event of a leak in the primary barrier. Notably, the drain system is not essential to the effectiveness of ignition pressure mitigation.

Due to mechanical and/or electrical failure, fuel from fuel storage compartment 406 may leak into equipment dry bay 400. The leaked fuel may be ignited within equipment dry bay 400 by the electrical equipment, generating an ignition 408. For example, sparks or overheating from shorts of wires or connectors may ignite flammable vapors. As described herein, the placement of partition 410 within equipment dry bay 400 preserves separation of electrical equipment 16 from each other, and further enhances safety against ignition 408 by precluding an electrical fault on one side of partition 410 from propagating around partition 410 and causing an ignition on the other side as a result of the same failure.

In the exemplary implementation, equipment dry bay 400 includes a partition 410 that facilitates mitigating effects of ignition 408, as described herein. Specifically, partition 410 divides equipment dry bay 400 into a first compartment 412 and a second compartment 414. In the exemplary implementation, equipment dry bay 400 includes a single partition 410. Alternatively, equipment dry bay may include a plurality of partitions 410 that divide equipment dry bay 400 into more than two compartments. Partition 410 includes a plate 420 and at least one flame arrestor 422 positioned in plate 420 providing vapor/fluid communication between first and second compartments 412 and 414. In the exemplary implementation, plate 420 is a metallic (e.g., aluminum) plate. Alternatively, plate 420 may be made of any material that enables equipment dry bay 400 to function as described herein.

Ignition 408 generates combustion gases 430 that increase a pressure within equipment dry bay 400. However, partition 410 facilitates mitigating the increase in pressure and containing ignition 408. Specifically, when ignition 408 occurs in first compartment 412, combustion gases 430 are vented through partition 410 (and more specifically, through flame arrestor 422) into second compartment 414. Flame arrestor 422 is sized to provide a relatively large flow area and low pressure drop as combustion gases 430 flow therethrough. As the burning gases pass through flame arrestor 422, the energy of the combustion is extracted from the gases by contact with flame arrestor 422, snuffing out the flame and significantly lowering the temperature and pressure of combustion gases 430 exhausting to the downstream side of partition 410.

As such, flame arrestor 422 extinguishes any ignition in combustion gases 430, and combustion gases 430 are transformed into a pressure relief exhaust plume 434 in second compartment 414. This facilitates minimizing a pressure rise in first compartment 412, and allows a nearly uniform average pressure to be created in both first and second compartments 412 and 414. For example, in an unpartitioned equipment dry bay, such as equipment dry bay 10 (shown in FIG. 1), the pressure may increase from ambient pressure to 125 pounds per square inch absolute (psia) in the event of an ignition. However, in the partitioned equipment dry bay 400, the pressure may increase to no more than approximately 37 psia. More specifically, in some implementations, the peak pressure generated from ignition 408 is in a range from approximately 29 to 33 psia against a baseline ambient pressure of 14.7 psia.

Accordingly, by venting high temperature, high pressure combustion gases 430 through flame arrestor 422, the pressure increase generated by ignition 408 is substantially mitigated. Further, due to the relatively large low pressure drop, flame arrestor 422 may also facilitate cooling combustion gases 430 as they pass therethrough. Moreover, flame arrestor 422 prevents ignition 408 from expanding from first compartment 412 to second compartment 414, thus denying deflagration of a large proportion of the flammable mixture present in equipment dry bay 400. As such, ignition 408 is contained within first compartment 412, and electronic equipment in second compartment 414 is not damaged by ignition 408. Notably, combustion gases 430 are not vented to an exterior of equipment dry bay 400 and the pressure reduction achieved above is substantial enough to bring peak ignition pressures within the bounds of other structural design limits.

Figure 5:
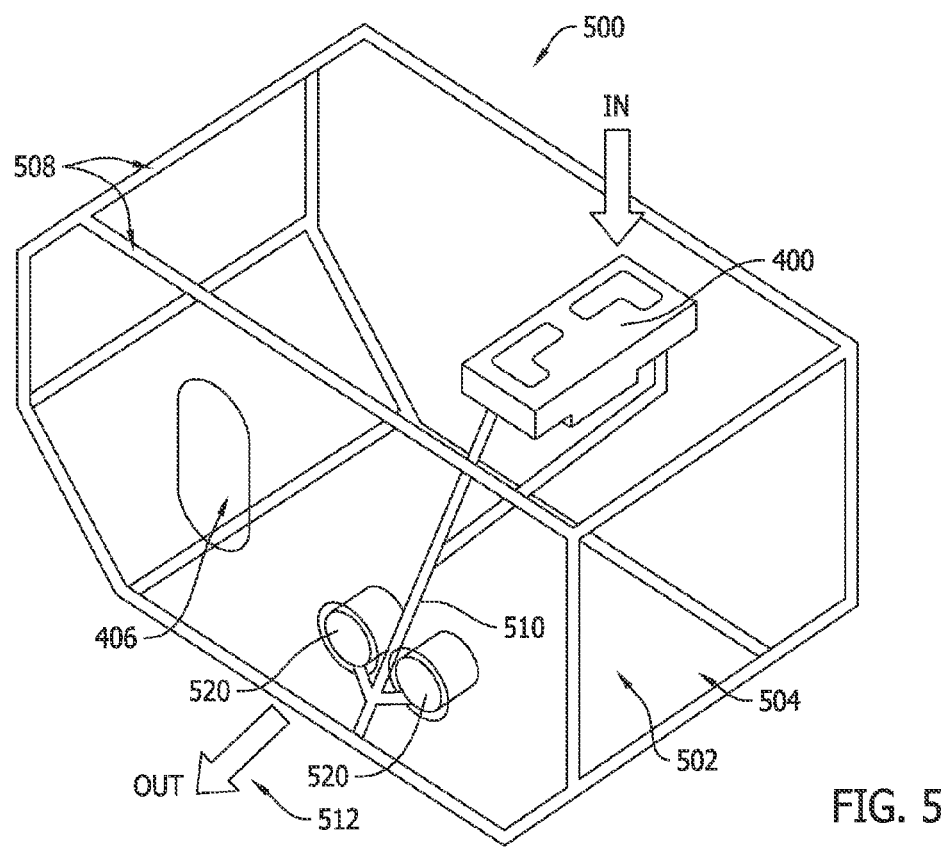
FIG. 5 is a perspective schematic view of an exemplary fuel tank that may use the equipment dry bay shown in FIG. 4.
Figure 6:
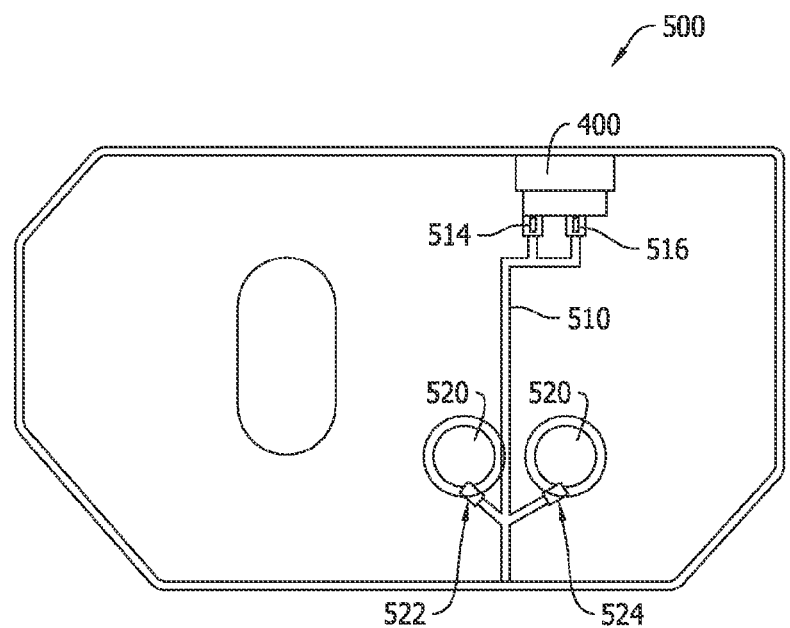
FIG. 6 is a side schematic view of the fuel tank shown in FIG. 5.

FIG. 5 is a perspective schematic view of an exemplary fuel tank 500 that may include equipment dry bay 400. FIG. 6 is a side schematic view of fuel tank 500. In the exemplary implementation, fuel tank 500 includes an outer surface 502 that is formed from a honeycomb core material 504 extending between corner voids 508. As shown in FIG. 5, a majority of the volume defined by fuel tank 500 is dedicated to fuel storage compartment 406.

To remove any fuel that leaks into equipment dry bay 400, vent and drain lines 510 are in flow communication with and extend from first and second compartments 412 and 414 such that leaked fuel flows to an outlet 512. In the exemplary implementation, a first external flame arrestor 514 is located at the interface between first compartment 412 and lines 510, and a second external flame arrestor 516 is located at the interface between second compartment 414 and lines 510. Accordingly, if ignition 408 occurs in first or second compartment 412 or 414, ignition 408 does not spread to lines 510.

Vent and drain lines 510 are also in flow communication with one or more pump dry bays 520 to facilitate draining fuel that has leaked into pump dry bays 520. In the exemplary implementation, fuel tank 500 includes two pump dry bays 520. Alternatively, fuel tank 500 may include any number of pump dry bays 520 that enables fuel tank 500 to function as described herein. Pump dry bays 520 may include valves, sensors, pumps, and/or other equipment used during operation of fuel tank 500.

In the exemplary implementation, a third flame arrestor 522 is located at the interface between one pump dry bay 520 and lines 510, and a fourth flame arrestor 524 is located at the interface between the other pump dry bay 520 and lines 510. Accordingly, if ignition 408 occurs in one of pump dry bays 520, ignition 408 does not spread to lines 510. In some implementations, pump dry bays 520 may also be coupled to one another using a partition similar to partition 410 (shown in FIG. 4). In such implementations, combustion gases 430 from an ignition 408 in one pump dry bay 520 will be vented to the other pump dry bay 520.

Figure 7:
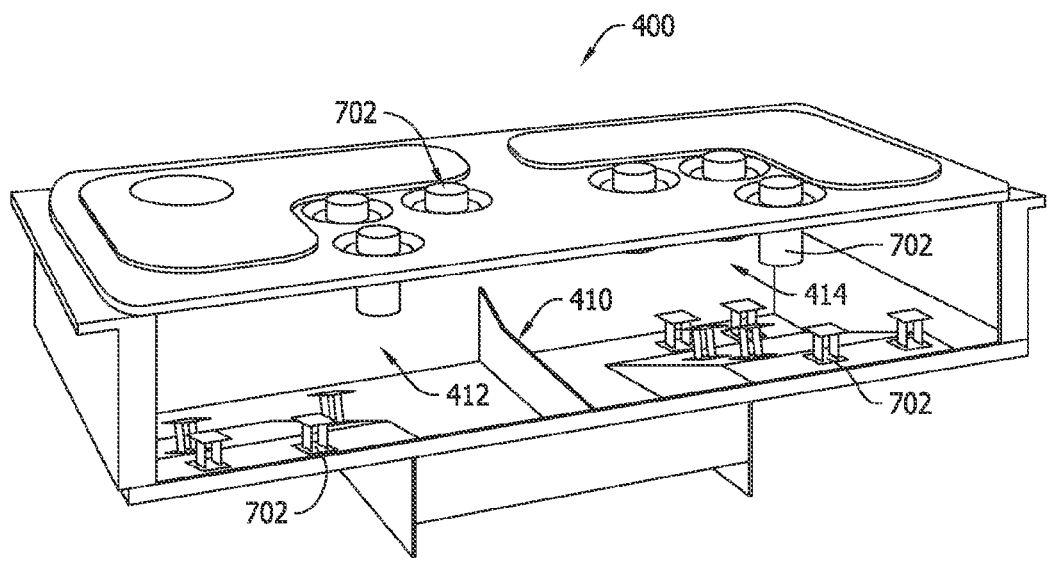
FIG. 7 is a perspective cut-away view of the equipment dry bay shown in FIG. 4.

FIG. 7 is a perspective cut-away view of equipment dry bay 400. For clarity, a front panel of equipment dry bay 400 is omitted and only a portion of partition 410 is shown in FIG. 7. Equipment dry bay 400 includes a plurality of electrical components 702. As explained above, a fault in one of electrical components 702 may generate an ignition in first or second compartments 412 and 414. However, partition 410 contains the combustion in the compartment in which the ignition was generated, and facilitates preventing the ignition from spreading to the other compartment.

Figure 8:
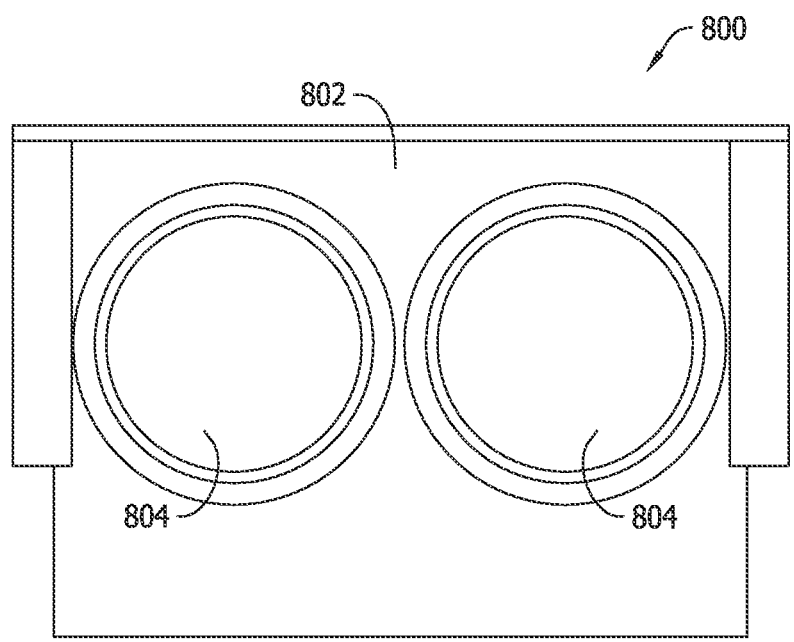
FIG. 8 is a front view of an exemplary partition with flame arrestors that may be used with the equipment dry bay shown in FIG. 4.

FIG. 8 is a front view of an exemplary partition 800 that may be used with equipment dry bay 400 (shown in FIGS. 4 and 7). In the exemplary implementation, partition 800 includes a plate 802 and two flame arrestors 804 positioned in plate 802. In the exemplary implementation, plate 802 is a metallic (e.g., aluminum) plate. Alternatively, plate 802 may be made of any material that enables partition 800 to function as described herein. As shown in FIG. 8, flame arrestors 804 are substantially cylindrical, and are aligned with one another (i.e., positioned at the same height on plate 802). Alternatively, partition 800 may include any number of flame arrestors 804 having any shape and/or any orientation that allows partition 800 to function as described herein. For example, the number of flame arrestors 804 may be selected to facilitate optimizing a ratio between a surface area of flame arrestors 804 and a volume of first and second compartments 412 and 414.

Further, in some implementations, partition 800 includes tubes or passages with flame arrestors 804 positioned therein. Alternatively, partition 800 may be configured from any material matrix that effectively extinguishes the flame while allowing free flow of combustion gases across the partition with minimal pressures loss. Moreover, in some implementations, partition 800 may be a structure integral to equipment dry bay 400 such that plate 802 is not a removable fastened structure, but rather an integrally machined rib and/or partition. Further, partition 800 may be a structure whose primary function is structural strength for equipment dry bay 400 or the structure in which equipment dry bay 400 is situated, apart from the pressures generated by an ignition. Notably, partition 800 with flame arrestors 804 might be used in structures where a flammable atmosphere may be present concurrently with ignition sources other than electrical equipment (e.g., lightning, combat threats, etc.).

The implementations described herein provide an equipment dry bay that includes a partition. The partition subdivides the equipment dry bay into a first compartment and a second compartment. Further, the partition includes a plate and at least one flame arrestor positioned within the plate. Accordingly, in the event that an ignition (e.g., an explosion) occurs in the first compartment, combustion gases from the ignition vent into the second compartment through the flame arrestor. This reduces pressure generated by the ignition, and prevents the ignition from spreading to the second compartment.

The implementations described herein provide improvements over at least some known fuel tank assemblies. As compared to at least some known fuel tank assemblies, the equipment dry bay described herein includes a partition with a flame arrestor that facilitates venting combustion gases from an ignition in one compartment into a second compartment. Venting the combustion gases significantly reduces the pressures generated by the ignition as compared with at least some known equipment dry bays. Accordingly, unlike at least some known equipment dry bays, the equipment dry bay described herein does not require additional expensive and heavy material that can withstand higher pressures. Further, the partition facilitates limiting the ignition to only a portion of the equipment dry bay, preventing damage to at least some electrical equipment in the equipment dry bay. This enhances redundancy where electrical systems and equipment on each side of the partition are redundant systems. Furthermore, electrical separation of systems separated by the partition (such that no circuit crosses the partition), whether redundant or otherwise, prevents an electrical fault (e.g., hot short) on one side of the partition from simultaneously occurring on the other side.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An equipment dry bay, said equipment dry bay comprising:
   at least one wall enclosing said equipment dry bay and configured as a barrier against fuel entry into said equipment dry bay;
   at least one partition coupled to said at least one wall and extending within said equipment dry bay, said at least one partition subdivides said equipment dry bay into a first compartment filled with air and a second compartment filled with air, wherein said at least one partition comprises:
   a plate; and
   at least one flame arrestor positioned within said plate such that airflow communication is provided between said first compartment and said second compartment, said at least one flame arrestor configured to vent combustion gases in said first compartment into said second compartment;
   a first independent circuit positioned within said first compartment; and
   a second independent circuit positioned within said second compartment, wherein said at least one partition is configured to preclude an electrical fault within said first independent circuit from propagating around said at least one partition into said second independent circuit such that an ignition caused by at least one of said first independent circuit or said second independent circuit is restricted from spreading between said first compartment and said second compartment.

2. An equipment dry bay in accordance with claim 1, wherein said at least one flame arrestor is configured to vent combustion gases from the ignition in said first compartment into said second compartment such that a peak pressure in said equipment dry bay resulting from the ignition is no greater than approximately 37 pounds per square inch absolute.

3. An equipment dry bay in accordance with claim 1, wherein said at least one flame arrestor comprises two flame arrestors.

4. An equipment dry bay in accordance with claim 1, wherein said at least one flame arrestor comprises a substantially cylindrical flame arrestor.

5. A fuel tank assembly comprising:
   a fuel storage compartment;
   at least one pump dry bay positioned within said fuel storage compartment; and
   an equipment dry bay positioned within said fuel storage compartment and comprising at least one wall enclosing said equipment dry bay, said at least one wall configured as a barrier against fuel entry into said equipment dry bay, said equipment dry bay further comprises at least one partition coupled to said at least one wall, wherein said at least one partition extends within said equipment dry bay and subdivides said equipment dry bay into a first compartment filled with air and a second compartment filled with air, wherein said at least one partition comprises:
   a plate; and
   at least one internal flame arrestor positioned within said plate such that airflow communication is provided between said first compartment and said second compartment, said at least one internal flame arrestor configured to vent combustion gases in said first compartment into said second compartment;
   a first independent circuit positioned within said first compartment; and
   a second independent circuit positioned within said second compartment, wherein said at least one partition is configured to preclude an electrical fault within said first independent circuit from propagating around said at least one partition into said second independent circuit such that an ignition caused by at least one of said first independent circuit or said second independent circuit is restricted from spreading between said first compartment and said second compartment.

6. A fuel tank assembly in accordance with claim 5, wherein said at least one internal flame arrestor is configured to vent combustion gases from the ignition in said first compartment into said second compartment such that a peak pressure in said equipment dry bay resulting from the ignition is no greater than approximately 37 pounds per square inch absolute.

7. A fuel tank assembly in accordance with claim 5, further comprising drain lines coupled between said equipment dry bay and said at least one pump dry bay.

8. A fuel tank assembly in accordance with claim 7, further comprising at least one external flame arrestor coupled between said equipment dry bay and said drain lines.

9. A fuel tank assembly in accordance with claim 7, further comprising:
   a first external flame arrestor coupled between said first compartment and said drain lines; and
   a second external flame arrestor coupled between said second compartment and said drain lines.

10. A fuel tank assembly in accordance with claim 7, further comprising at least one external flame arrestor coupled between said at least one pump dry bay and said drain lines.

11. A fuel tank assembly in accordance with claim 5, wherein said at least one internal flame arrestor comprises two flame arrestors.

12. A fuel tank assembly in accordance with claim 5, wherein said at least one internal flame arrestor comprises a substantially cylindrical flame arrestor.

13. A fuel tank assembly in accordance with claim 5, wherein said plate comprises a metallic plate.

14. A method for containing ignitions within an equipment dry bay, said method comprising:
   subdividing the equipment dry bay into a first compartment filled with air and a second compartment filled with air using at least one partition, the equipment dry bay including at least one wall enclosing the equipment dry bay, the at least one wall configured as a barrier against fuel entry into the equipment dry bay, the at least one partition coupled to the at least one wall and extending within the equipment dry bay, wherein the at least one partition includes a plate and at least one flame arrestor positioned within the plate such that airflow communication is provided between the first compartment and the second compartment;
   positioning a first independent circuit within the first compartment and a second independent circuit within the second compartment, wherein the at least one partition is configured to preclude an electrical fault within the first independent circuit from propagating around the at least one partition into the second independent circuit such that an ignition caused by at least one of the first independent circuit or the second independent circuit is restricted from spreading between the first compartment and the second compartment; and venting combustion gases from the ignition in the first compartment into the second compartment through the at least one flame arrestor.

15. A method in accordance with claim 14, wherein venting combustion gases comprises venting combustion gases such that a peak pressure in the equipment dry bay resulting from the ignition is no greater than approximately 37 pounds per square inch absolute.

16. A method in accordance with claim 14, wherein subdividing the equipment dry bay comprises subdividing the equipment dry bay using at least one partition that includes a pair of flame arrestors positioned within a metallic plate.

\* \* \* \* \*